Figure 1:
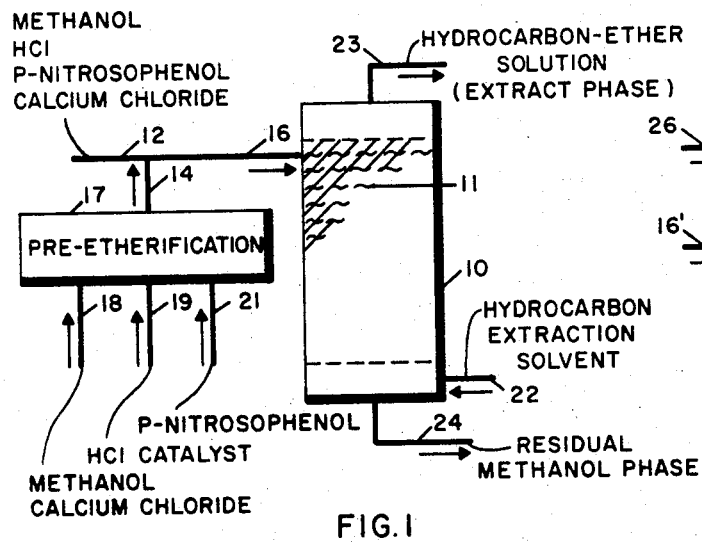

Dec. 17, 1968

F. E. WILLIAMS 3,417,147

MANUFACTURE OF p-NITROSOPHENYLMETHYL AND
p-NITROSOPHENYLETHYL ETHERS

Filed July 6, 1964

2 Sheets-Sheet 1

FREDERICK E. WILLIAMS
INVENTOR.

BY Ernest G. Peterson
AGENT

FREDERICK E. WILLIAMS
*INVENTOR.*

3,417,147
MANUFACTURE OF p-NITROSOPHENYLMETHYL
AND p-NITROSOPHENYLETHYL ETHERS
Frederick E. Williams, Newark, Del., assignor to Hercules Incorporated, a corporation of Delaware
Filed July 6, 1964, Ser. No. 380,377
13 Claims. (Cl. 260—612)

This invention relates to a process for the manufacture of p-nitrosophenylalkyl ethers, at higher than normal equilibrium conversion levels, by reaction of p-nitrosophenol with methanol, or ethanol, concurrently with solvent extraction of ether product from the ether-forming reaction mixture utilizing a novel solvent system of which the solvent, exhibiting high solvent action for the ether product per se but substantially miscible with the ether-forming reaction mixture, is caused by the presence of an inorganic halide dissolved in the reaction mixture to form a separate liquid phase which serves as a selective solvent for the ether product without loss of its high solvent action therefor. In another aspect, this invention relates to a process above described wherein extract phase passed from the ether-forming reaction mixture is contacted with methanol, or ethanol, which is maintained, by the presence of an inorganic halide dissolved therein, as a liquid phase separate from the extract and which is to be passed to the ether-forming reaction mixture, whereby any unreacted p-nitrosophenol dissolved in the extract is extracted for return to the ether-forming reaction to provide for further conversion and for a high purity solvent solution of ether product. In still another aspect, this invention relates to a process above described wherein the extraction solvent and ether-forming reaction mixture are countercurrently contacted either on a batch or continuous flow basis. Other aspects of the invention will be apparent from the accompanying disclosure and the claims.

The manufacture of p-nitrosophenyl ethers by the acid catalyzed reaction of p-nitrosophenol with a primary or secondary alcohol as the etherification agent is disclosed and claimed in U.S. Patent 3,107,265, granted Oct. 15, 1963, to De Butts et al., and assigned to Hercules Incorporated. The etherification is an equilibrium reaction as shown by the equation:

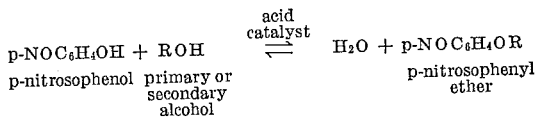

In accordance with the above said equilibrium, the conversion of p-nitrosophenol is generally in the order of 50–55 percent, or higher, dependent upon the etherification reaction conditions. The equilibrium can be shifted to the ether side by the vacuum fractional distillation of water of etherification from the ether-forming reaction as disclosed and claimed in the above said U.S. Patent 3,107,265 or by sparging a gas through the said ether-forming reaction mixture, as disclosed and claimed in the copending application of De Butts et al., Ser. No. 17,893, filed Mar. 28, 1960, now abandoned.

In accordance with the vacuum fractional distillation technique, maximum conversion is in the order of 65 percent, and higher, and in accordance with the sparging technique, conversions in the order of 90 percent and higher can be obtained. However, when following the vacuum fractional distillation route, and generally the sparging route, there is a need for neutralization of the etherification effluent to facilitate recovery of unreacted p-nitrosophenol and associated processing for recycle. The p-nitrosophenol reactant usually contains a small proportion of impurities, say from 3–5 percent, dependent upon its preparative method, and these impurities have heretofore appeared in the recovered ether product, which has then required special processing for removal of the contaminants.

This invention is concerned with a process for the manufacture of methyl and ethyl ethers of p-nitrosophenol which provides ether product of high purity, without the need for special processing of same, at conversion levels markedly higher than those of the normal etherification equilibrium and which, in preferred embodiments, eliminates the need for neutralization and associated processing of unreacted p-nitrosophenol for separation and recovery of same.

In accordance with the invention, an etherification process is provided which comprises reacting, in liquid phase, p-nitrosophenol with an alcohol selected from the group consisting of methanol and ethanol, in the presence of an acid as a catalyst, to form the corresponding p-nitrosophenyl ether; contacting resulting etherification reaction mixture, in the presence of an inorganic halide dissolved therein, and described hereinafter, with an organic solvent selected from the group consisting of (1) an aromatic hydrocarbon of the group of benzene and methylbenzenes containing from 5 to 65 volume percent of a saturated aliphatic hydrocarbon of the group of paraffins containing from 5 to 10 carbon atoms, and single ring cycloparaffins containing from 5 to 7 carbon atoms in the ring, (2) organic halides of the group of isopropyl chloride, isopropyl bromide, n-amyl bromide, n-amyl chloride, and phenyl monochloride, also containing from 5 to 65 volume percent of a saturated aliphatic hydrocarbon above described, and when said alcohol is methanol said organic solvent also being selected from the group consisting of (3) the above described aromatic hydrocarbons and organic halides; and said inorganic halide being selected from the group consisting of calcium chloride, magnesium chloride, lithium chloride, cobalt chloride, nickel chloride, calcium bromide, and sodium iodide, and present in the said reaction mixture in an amount of from about 12 weight percent up to saturation, based upon the said alcohol therein, whereby the said solvent, which exhibits high solvent action for the ether product but is normally completely miscible with the ether-forming reaction mixture is caused by the presence of said inorganic halide to form a liquid phase separate from said reaction mixture, and the resulting solvent phase retains the high solvent action of said solvent for said ether product to function as a highly selective solvent therefor, and recovering resulting extract phase as product of the process.

In accordance with a now preferred embodiment, the extract phase from the etherification is contacted with at least a portion of the alcohol reactant to be charged to the etherification reaction mixture and containing dissolved therein an inorganic halide above described and in the above said proportion, whereby due to presence of the inorganic halide, the alcohol and extract from separate liquid phases, and unreacted p-nitrosophenol dissolved in the extract is extracted into the resulting alcohol phase for return to the etherification reaction. This embodiment eliminates the need for neutralization and associated processing that would otherwise be required in the recovery of unreacted p-nitrosophenol for recycle and for recovery of ether product substantially free from all contaminants.

In carrying out the process of the invention, the etherification is preferably initiated prior to the extraction step inasmuch as the etherification reaction time is longer than that of the extraction, and the pre-etherification is, therefore, advantageously utilized in order to provide for the presence of the ether product in a maximum available concentration in order to most efficiently carry out the extraction and equilibrium shift. A pre-etherification step is also advantageous from the standpoint of equipment requirements, inasmuch as to provide for the necessary etherification reaction time in the extraction zone would require correspondingly larger scale equipment without any advantage accruing to the extraction per se. However, it is within the scope of the invention to carry out the entire etherificaion, when desired, in the ether-extraction zone.

It is to be noted that when the etherification alcohol reactant is ethanol, the extraction solvent must necessarily contain a saturated hydrocarbon in a concentration of from about 35 to 65 volume percent to cause formation of separate solvent and etherification reaction mixture phases. When the alcohol reactant is methanol, the presence of a saturated aliphatic hydrocarbon in the solvent is unnecessary so far as need for separation of solvent and etherification reaction mixture phases is concerned, although the presence of from 5 to 35 volume percent of the saturated hydrocarbon is often advantageous.

The invention is illustrated with reference to the following examples:

EXAMPLE 1

3.4 grams of anhydrous calcium chloride was dissolved in 16 grams of dry methanol. To this solution was added 2.5 grams of p-nitrosophenol (93 percent pure) and 0.085 gram of anhydrous HCl in methanol. The resulting admixture was agitated for 15 minutes at 25–30° C. and allowed to stand for 10 minutes. The conversion was essentially that of the etherification equilibrium illustrated hereinabove, namely, about 53 percent.

3 vols. of a hydrocarbon mixture of 70 volume percent benzene and 30 volume percent isooctane, per volume of etherification reaction mixture, was added to the resulting etherification reaction mixture which was then agitated for 15 mintues at about 25° C. under which conditions two distinct liquid phases separated, namely, an upper hydrocarbon layer and a relatively small lower methanol layer. Analysis of the two phases showed a total conversion of 80 percent of the original p-nitrosophenol reactant to p-nitrosophenylmethyl ether, and of this, 75 percent was in the upper phase. Unreacted p-nitrosophenol was found to be distributed 25 percent in the upper phase and 75 percent in the lower phase.

This example demonstrates the distribution of unreacted p-nitrosophenol between the alcohol and extraction solvent phases and the role of the solvent phase in extracting ether product from the etherification reaction mixture, to drive the conversion beyond the normal equilibrium value. The example also demonstrates the separation of ether product from unreacted p-nitrosophenol without the need for further processing, which generally involves neutralization, followed by precipitation, of the p-nitrosophenol.

The procedure of this example was repeated except in the absence of calcium chloride from the system under which conditions the added hydrocarbon was completely miscible with the etherification reaction mixture so that a single reaction mixture phase was produced, thus precluding a preferential separation of the ether product from the etherification reaction mixture.

Also, as shown hereinabove, when calcium chloride was present in the etherification reaction mixture, in the absence of the hydrocarbon component, the conversion was that of the normal equilibrium, namely, about 53 percent. This demonstrates that the equilibrium shift obtained in the practice of the invention cannot be attributed to a dehydrating effect of the anhydrous calcium chloride to remove water of etherification from the etherification reaction mixture.

EXAMPLE 2

A series of runs was made in accordance with the procedure of Example 1 in the etherification of p-nitrosophenol with methanol in the presence of HCl to form the corresponding p-nitrosophenyl ether. In each instance, 3.4 grams of anhydrous calcium chloride was dissolved in 16 grams of dry methanol, and to the resulting solution was added 2.5 grams of p-nitrosophenol and 0.085 gram of HCl as 37 percent aqueous hydrochloric acid. The resulting admixture was agitated for 15 minutes at 25–30° C. and allowed to stand for 10 minutes.

In each run, an extraction solvent, shown below, was added to the resulting etherification reaction mixture in a liquid volume ratio thereto of 3:1, followed by agitation for 15 minutes at about 25° C., under which conditions two distinct liquid phases separated, namely, an upper extraction solvent layer and a relatively small lower methanol layer. Conversion was 70–78 percent as shown.

Extraction solvent: Percent conversion
Toluene _____ 70
p-Cymene _____ 72
p-Xylene _____ 72
2-chloropropane _____ 70
2-bromopropane _____ 74
Benzene (70 percent)—cyclohexane (30 percent) _____ 78

EXAMPLE 3

The following liquids, illustrative of the selective solvents utilized in the practice of the invention and containing about 15 grams of the indicated inorganic halide per 100 ml. of solution were admixed in equivolume proportions with methanol at room temperature. As indicated, the resulting admixture in each instance formed separate solvent and methanol liquid phases. In the absence of the inorganic halide, the resulting admixture in each instance would have been single phase.

| Inorganic halide | Benzene | Benzene/ Isooctane* | i-Propyl chloride | n-Amyl chloride | i-Propyl bromide | n-Amyl bromide | Phenyl monochloride |
|---|---|---|---|---|---|---|---|
| Calcium chloride | 2 phases | 2 phases | 2 phases | 2 phases | 2 phases | 2 phases | 2 phases. |
| Magnesium chloride | do | do | do | do | | | |
| Lithium chloride | do | do | do | do | | | |
| Cobalt chloride | do | do | do | do | | | |
| Nickel chloride | do | do | do | do | | | |
| Calcium bromide | do | do | do | do | | | |
| Sodium iodide | do | do | do | do | | | 2 phases. |

*15 liquid volume percent isooctane and 85 volume percent benzene.

EXAMPLE 4

The procedure of Example 1 was repeated except that an equivalent amount of HCl, as 37 percent aqueous hydrochloric acid, was substituted for the anhydrous methanolic hydrogen chloride. Conversion of p-nitrosophenol to the ether product was the same as that of Example 1, namely, 80 percent, thereby demonstrating the shift of equilibrium that took place by removal of ether product from the equilibrium even in the presence of additional water.

The invention in a now preferred form comprises countercurrently contacting the etherification reaction mixture with the extraction solvent, either batchwise or on a continuous flow basis.

Thus, in accordance with one embodiment, the etherification reactants as a mixture, including the added inorganic halide, are passed into a central section of an upright contacting chamber and then downwardly, or upwardly, dependent upon the density of the solvent, the latter being passed into the lower or upper section for effecting the countercurrent contact. Etherification is generally initiated outside the contacting zone and is preferably brought to the equilibrium conversion level before being charged to the chamber. In all events, during the contacting of the etherification reaction mixture with solvent, the etherification is continued as a result of the selective solvent extraction of ether product to cause the equilibrium to shift to the ether side with accompanying increase in conversion.

During the countercurrent contacting, the extraction solvent incidentally extracts from the etherification reaction mixture some unreacted p-nitrosophenol and also a minor proportion, i.e., traces, of the impurities present in the original p-nitrosophenol reactant, the major proportion of the said impurities remaining in the etherification reaction mixture phase. These incidentally extracted materials are removed from the resulting extract phase by extraction into at least a portion of the total alcohol reactant to be passed to the ether-forming reaction mixture and containing an inorganic halide dissolved therein as described. The alcohol reactant so contacted with extract phase is most advantageously passed in countercurrent contact flow relationship therewith and then into the etherification reaction mixture, i.e., as a component thereof. Except for the presence of the dissolved inorganic salt during the alcohol reactant-extract phase contact, the mixture of alcohol and extract would be single phase.

As result of the alcohol-extract contacting step, unreacted p-nitrosophenol distributed between the etherification reaction mixture and the solvent and thus carried by the extract, is returned to the system until it is substantially completely quantitatively converted. Impurities normally introduced into the etherification reaction system with the p-nitrosophenol reactant and which are, to an extent, extracted into the solvent during countercurrent contact of same with the etherification reaction mixture, are removed from the system in the residual reaction mixture to provide for a substantially contaminant-free extract.

In another embodiment, countercurrent flow contact of extraction solvent and ether-forming reaction mixture is carried out without need for subsequent contact of the resulting solvent-ether solution (extract) with a separate portion of alcohol reactant. This embodiment is advantageously utilized when the presence of impurities and unreacted p-nitrosophenol in the extract phase is permissible.

These embodiments, utilizing a countercurrent continuous flow relationship of extraction solvent with etherification reaction mixture, are illustrated in detail with reference to FIGS. 1, 2 and 3 of the drawings. A countercurrent batch etherification extraction system of the invention is illustrated with reference to FIG. 4.

Figure 2:
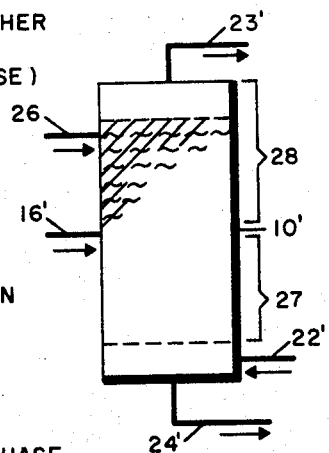
Figure 3:
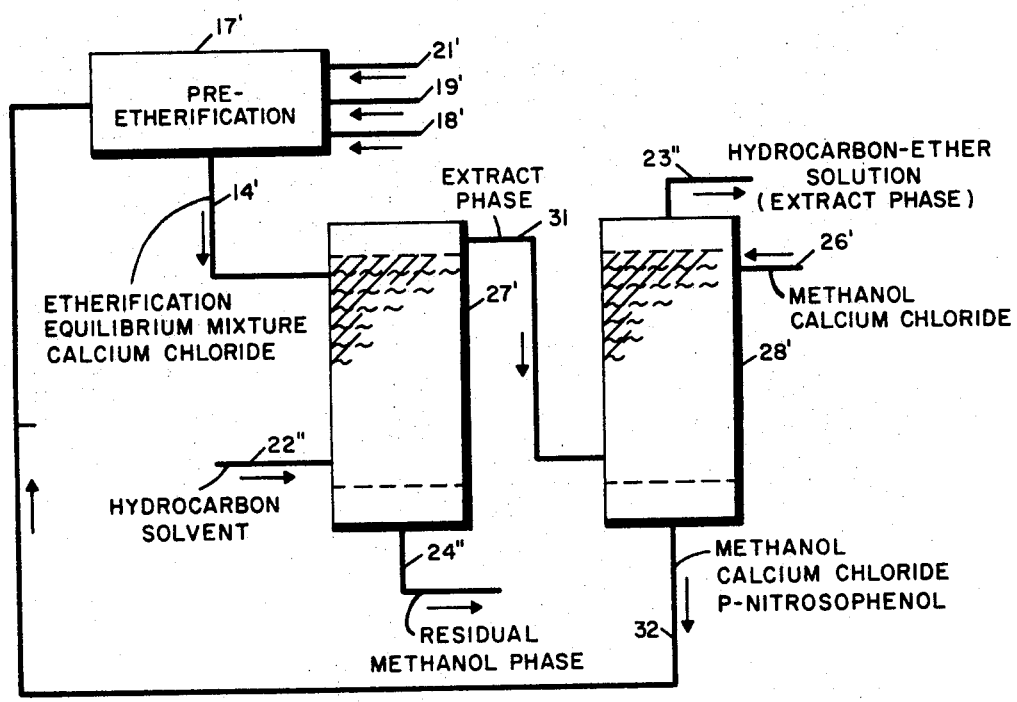

Of the said FIGS. 1-3, FIG. 1 illustrates a single upright chamber, or column, into which etherification reactants or product of pre-etherification, as desired, are continuously introduced at the top and gravitated in countercurrent contact flow relationship with upwardly flowing extraction solvent introduced at the bottom; FIG. 2 illustrates a single upright chamber, or column, into which etherification reactants, or product of pre-etherification, if desired, are continuously introduced at a central point, a separate portion of the alcohol reactant containing an inorganic halide, as described above, is introduced at the top and extraction solvent is introduced at the bottom, and wherein the additional alcohol stream and the etherification reactant stream are gravitated in countercurrent contact flow relationship with upwardly flowing extraction solvent; and FIG. 3 illustrates a two-column, or chamber, system embodying the principle of stream addition of FIG. 2. It is to be understood that although the invention is specifically illustrated with reference to FIGS. 1-3, in terms of process utilizing a hydrocarbon liquid as the extraction solvent, and methanol as the etherification alcohol reactant, including a portion thereof as an additional alcohol stream of FIGS. 2 and 3, HCl as the catalyst for the etherification, and calcium chloride as the inorganic halide, other extraction solvents, etherification reactants, inorganic halides and the like can be utilized consonant with the disclosure herein.

Referring to FIG. 1, an upright extraction chamber 10 containing conventional packing such as Rashig rings 11 is charged via lines 12 and 16 with a solution of substantially dry reactants, and acid catalyst for the etherification, and containing from 12 weight percent up to a saturation amount of the inorganic halide, based upon the amount of alcohol charged. Inasmuch as the etherification requires a manifold longer time than that required for the ether extraction, it is most advantageous from the standpoint of time and equipment requirements to initiate the etherification outside the ether extraction zone and thereby reduce the time requirement in chamber 10 to that necessary for accomplishing the contemplated equilibrium shift. Accordingly, it is preferred to inititate the etherification in zone 17 outside chamber 10 and pass the resulting pre-etherification reaction mixture into chamber 10. Thus, methanol containing calcium chloride, methanolic HCl and p-nitrosophenol are introduced into zone 17 via lines 18, 19 and 21, respectively, and maintained under conditions, described hereinatfer, for effecting the etherification, i.e., reaction of the methanol with p-nitrosophenol in the presence of the HCl catalyst to form p-nitrosophenylmethyl ether. Resulting pre-etherification reaction mixture, formed at an "equilibrium conversion" level, say in the order of 50 percent, is then passed from zone 17 via lines 14 and 16 into a top section of chamber 10 for gravitation therein.

A predominantly aromatic hydrocarbon liquid such as an 80 percent benzene-20 percent isooctane mixture, is charged into a bottom section of chamber 10 via line 22 as the selective extraction solvent. The aromatic hydrocarbon solvent thus introduced into chamber 10 is normally completely miscible with the downwardly moving etherification reaction mixture in chamber 10 except for the presence of the calcium chloride, which causes the hydrocarbon to form a liquid phase separate from the liquid etherification reaction mixture. Hydrocarbon thus introduced into chamber 10 and immiscible with other liquids therein, and lighter, rises upwardly and toward outlet conduit 23, the remaining liquid in the column, namely, residual etherification reaction mixture referred to herein as residual alcohol phase, descending in chamber 10 toward outlet conduit 24. The liquid volume ratio of hydrocarbon solvent introduced into chamber 10 via line 22 to total etherification reaction mixture introduced via line 16 is generally from about 2:1 to 6:1 although ratios above that range can be utilized when desired.

The interior of column 10 is maintained at a temperature in a preferred range of from about 20 to about 45° C., and the residence time of the etherification reactants is in a preferred range of frome about 20 to 40 minutes, under which conditions, the aromatic hydrocarbon phase as the extraction solvent extracts p-nitrosophenylmethyl ether product from the etherification reaction mixture to cause the equilibrium to shift to the ether side. Resulting extract phase discharged from chamber 10 via line 23 generally contains in the order of from 5 to 10 percent p-nitrosophenylmethyl ether as product.

Residual methanol in line 24 contains substantially all impurities initially present in the p-nitrosophenol reactant introduced via lines 12 or 21. Effluent methanol from line 24 is distilled for recovery of methanol and traces of hydrocarbon, for recycle to zone 10 when desired. The content of any unreacted p-nitrosophenol in the methanol phase from line 24 is generally insufficient to justify processing for its recovery and recycle.

With reference to FIG. 2, the same charge as in line 16 of FIG. 1 is introduced into upright chamber 10′ via line 16′ into a central section of chamber 10′, except that a portion of the total methanol reactant, say 10 to 30 percent, is charged via line 26. Generally, the amount of methanol charged via line 26 is not greater than that which would increase the mole ratio of total methanol to p-nitrosophenol, introduced into the etherification reaction mixture, to above about 100:1. In this embodiment, the mole ratio of methanol to p-nitrosophenol charged into the central section of chamber 10′ via line 26 is below 100:1 and preferably about 15:1 to 30:1.

Hydrocarbon solvent the same as that in line 22 of FIG. 1 is introduced into a lower section of chamber 10′ via line 22′. Methanol-calcium chloride, i.e., containing calcium chloride in an amount of from about 12 weight percent up to saturation, is introduced into an upper portion of zone 10′ via line 26 as above described. Although a solution of reactants and catalyst, including the organic halide, can be directly charged to the extraction chamber 10′ via line 16′, it is most advantageous to effect a pre-etherification outside the chamber (not shown) as discussed with reference to zone 17 of FIG. 1. The charge to chamber 10′ is, therefore, more preferably an equilibrium reaction mixture such as from line 14 of FIG. 1. Accordingly, in the preferred practice of the embodiment of FIG. 2, the etherification is initiated outside chamber 10 and is continued as the etherification reaction mixture descends in chamber 10′ toward outlet 24′. Hydrocarbon solvent from line 22′ ascends in zone 10′ toward outlet 23′. In this manner, the etherification equilibrium initiated outside chamber 10′ and continued in chamber 10′ is shifted to the ether side as the ether product is extracted by the hydrocarbon solvent introduced from line 22′. The relative volumes of hydrocarbon and total etherification reactants and catalyst charged to tower 10′ are the same as in tower 10 of FIG. 1.

Hydrocarbon phase ascending in chamber 10′ and containing ether product, extracted as above described, incidentally extracts some relatively small proportions of unreacted p-nitrosophenol, say, from about 15 to 30 percent of that which remains unconverted, as illustrated with reference to Example 1. When hydrocarbon phase ascending in the upper section 28 of chamber 10′ is passed in contact with downwardly flowing methanol-calcium chloride from line 26, unreacted p-nitrosophenol incidentally extracted into the hydrocarbon phase during contact in lower chamber section 27 is extracted from the hydrocarbon solvent in the upper chamber section 28 by the separate methanol phase in contact therewith and is carried back in the thus enriched methanol phase to the etherification zone, i.e., into lower section 27, for further reaction under the etherification conditions therein.

Impurities in the p-nitrosophenol reactant, as described, are ultimately concentrated in the methanol phase discharged via line 24′. Temperature conditions in the upper section of chamber 10′ are generally the same as in the lower section, preferably in the range of about 20–45° C.

Hydrocarbon-ether solution, i.e., extract phase, substantially free from contaminants and containing generally from 5 to 10 weight percent p-nitrosophenylmethyl ether product is discharged from zone 10′ via line 23′. Residual alcohol phase, containing less than about 1 weight percent of unreacted p-nitrosophenol and impurities brought into the system with p-nitrosophenol reactant, is withdrawn via line 24′ for use outside the system or processing for recovery and recycle of methanol. As in the embodiment of FIG. 1, processing of methanol phase from line 24′ for recovery and recycle of unreacted p-nitrosophenol is generally not economically feasible because of the very low content of unreacted p-nitrosophenol therein.

With reference to FIG. 3, two separate upright chambers are utilized in carrying out the continuous extraction-etherification of FIG. 2. Thus, chamber 27′ is equivalent in function to the lower section 27 of chamber 10′ and chamber 28′ is equivalent in function to the upper portion 28 of chamber 10′. The use of two separate chambers as illustrated with reference to FIG. 3 constitutes the preferred continuous process embodiment of the invention.

Thus, methanol-calcium chloride, HCl catalyst and p-nitrosophenol are introduced into etherification zone 17′ via inlet lines 18′, 19′ and 21′, respectively, and reacted in chamber 17′ as described hereinabove, with reference to etherification in chamber 17 so as to reach etherification equilibrium.

The resulting etherification equilibrium mixture is then passed from zone 17′ via line 14′ into an upper section of chamber 27′ in countercurrent downward flow contact with liquid hydrocarbon, the same as that in lines 22 and 22′ of FIGS. 1 and 2, introduced into a lower portion of zone 27′ via line 22″. Hydrocarbon-ether solution (extract phase) from chamber 27′ is discharged from an upper portion thereof via line 31 and into a bottom section of chamber 28′ and ascends therein in counter-current flow contact with a downwardly moving solution of methanol-calcium chloride introduced into an upper section of zone 28′ via line 26′. The temperature and flow conditions, including concentrations of all components, in chambers 27′ and 28′ are the same as those in lower section 27 and upper section 28, respectively, of chamber 10′ of FIG. 2.

In chamber 28′, substantially all unreacted p-nitrosophenol present in extract phase from line 31 is extracted therefrom into the methanol-calcium chloride stream from line 26′ to provide for effluent hydrocarbon-ether product solution discharged via line 23″, substantially free from unreacted p-nitrosophenol as well as contaminants initially present in the p-nitrosophenol reactant. Methanol phase, which contains calcium chloride, traces of the impurities initially present in the p-nitrosophenol reactant, and substantially all the unreacted p-nitrosophenol extracted from the extract phase from chamber 27′ is discharged from chamber 28′ via line 32. Ether product of high purity is then recoverable from the hydrocarbon-ether solution in line 23″ without need for further processing.

Methanol phase in line 32 is passed to etherification zone 17′ as a component of the pre-etherification therein. Residual phase withdrawn via line 24″ can be passed to storage or use external to the system, but more often is passed to a suitable recovery step, e.g., a distillation (not shown), for recovery of methanol, and for recycle to the system via chamber 17′.

Figure 4:
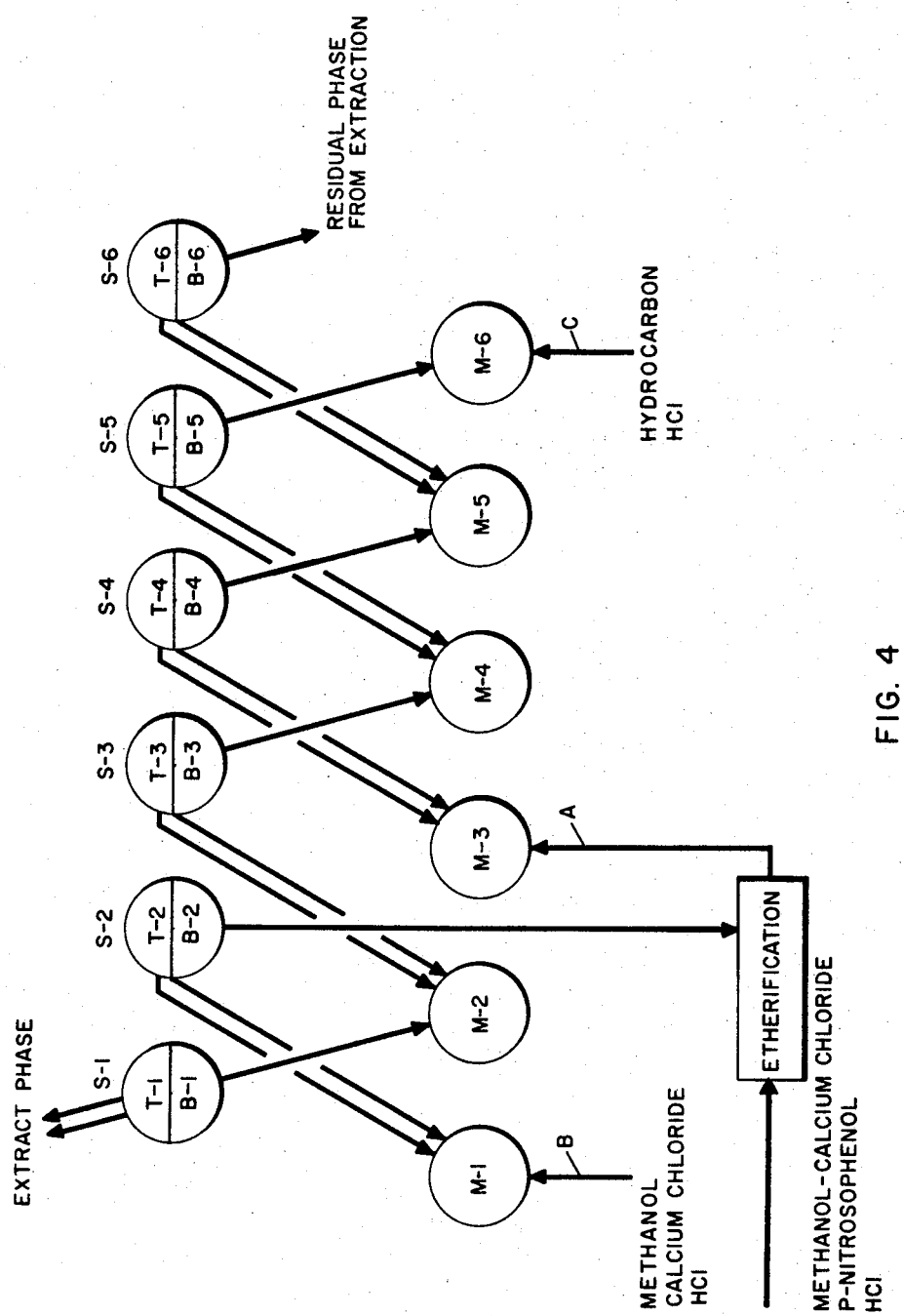

FIG. 4 is illustrative of a batch type embodiment of countercurrent flow contact of ether-forming reaction mixture and extraction solvent of the invention in terms of process utilizing a hydrocarbon liquid as the extraction solvent, methanol as the etherification alcohol reactant, HCl as the etherification catalyst and calcium chloride as the inorganic salt. It is to be understood that other solvents, inorganic halides and the like can be utilized in lieu of those specifically referred to, consonant with the disclosure herein.

Referring to FIG. 4, each of a series of six mixing vessels in the positions M–1, M–2, M–3, M–4, M–5 and M–6 was charged as follows:

| Position: | Charge |
|---|---|
| M–1 | 60 ml. of HC* <br> 10 ml. of MeOH-CaCl$_2$** <br> 0.10 ml. 37 percent HCl |
| M–2 | 60 ml. of HC* <br> 10 ml. of MeOH-CaCl$_2$** <br> 0.10 ml. 37 percent HCl |
| M–3 | 60 ml. of HC* <br> Etherification reaction charge consisting of 20 ml. CH$_3$OH-CaCl$_2$,** 2.5 grams 93 percent p-nitrosophenol and 0.15 ml. 37 percent aqueous HCl |

| Position: | Charge |
|---|---|
| M-4 | 60 ml. of HC* |
|  | 20 ml. MeOH-CaCl₂** |
| M-5 | 60 ml. of HC* |
|  | 20 ml. MeOH-CaCl₂** |
| M-6 | 60 ml. of HC* |
|  | 20 ml. MeOH-CaCl₂** |
|  | 0.10 ml. 37 percent HCl |

*Hydrocarbon—42 ml. benzene plus 18 ml. isooctane.
**Contains 0.17 gram CaCl₂ per ml.

In carrying out the process of FIG. 4, the etherification reactants are added to a central section of the countercurrent extraction system M-3, methanol-calcium chloride is added to the system at the "top" end, M-1, and liquid hydrocarbon-HCl is added at the bottom end, M-6. There are a number of individual contacting steps, as described hereinafter, each of which involves contact of hydrocarbon with methanol phase, moving the hydrocarbon toward the top end of the assembly and moving the methanol phase toward the central section and then toward the bottom end.

The etherification reactants in the vessel in the M-3 position are agitated say, for 25 minutes at 30° C. to bring the etherification reaction mixture to equilibrium and this can be done either before or subsequent to charging the reactants to the said vessel. The six vessels as initially charged are then agitated for a period of about 15 minutes, upon termination of which, they are then supported in the respective positions S-1 through 6. In each of the said positions S-1 through 6, a separate hydrocarbon phase T and methanol phase B separate as shown.

Individual steps referred to hereinabove are indicated in the diagram of FIG. 4 by the arrows. Thus, residual phase from extraction, i.e., methanol phase B-6, is discarded from the vessel in the S-6 position and except for start-up, contains unreacted methanol containing such a small porportion of unreacted p-nitrosophenol together with impurities from the initial p-nitrosophenol reactant that any attempt to recover the small proportion of p-nitrosophenol is unimportant from the standpoint of practicability. The final hydrocarbon-ether solution, i.e., extract phase T-1, is removed from the vessel in the S-1 position and, except for start-up, contains ether product in yield of 95 percent and higher and is substantially free from unreacted p-nitrosophenol and contaminants inherently present in the p-nitrosophenol reactant.

Continuing the extraction, the vessel in S-6 position containing only hydrocarbon phase T-6 is moved to the position M-5 into which methanol phase B-4 from the vessel in S-4 position is passed. A new vessel is placed in position, M-6, into which methanol phase B-5 from the vessel in S-5 position is passed for contact with hydrocarbon and HCl from inlet C. The vessel in S-5 position containing only the hydrocarbon phase T-5 is then moved into the M-4 position and into which methanol phase B-3 is passed from the vessel in S-3 position. Vessel S-4 now containing only hydrocarbon phase T-4 is moved into position M-3 into which etherification reaction mixture from conduit A, including methanol phase B-2 of the vessel in the S-2 position, is passed. The vessel in S-2 position, now containing only hydrocarbon phase T-2, is moved into M-1 position, into which methanol- CaCl₂—HCl from inlet conduit B is passed. Vessel S-3 containing hydrocarbon phase T-3 is then moved to position M-2 and into which is passed methanol phase B-1 from the vessel in the S-1 position. The vessel in S-1 position, now empty, is that placed in M-6 position as described hereinabove.

It is seen in the above illustrated batchwise extraction that in each step, the hydrocarbon layer has been moved toward the "top" of the extraction zones 1 to 6 and each methanol layer has been moved toward the "bottom" of the said zone. Thus, in carrying out the individual steps until the first described T-6 hydrocarbon phase becomes the T-1 phase and the first described B-1 methanol phase finally becomes the B-6 phase, there has been one complete transfer of hydrocarbon phase to the "top" of the zone and methanol phase to the "bottom" to provide a substantially contaminant-free hydrocarbon layer containing ether product in high yield, and methanol phase substantially free from unreacted p-nitrosophenol.

In carrying out the above batch extraction, employing the same materials in the proportions shown, twenty-three complete transfers, i.e., separate batch extractions, were made to reach a steady state throughout the extraction system, and the results are summarized with reference to the twenty-first to twenty-third transfers as follows:

| Transfer No. | Grams ether product in HC phase T-1 | Grams ether product in methanol phase B-6 | Grams unreacted p-nitrosophenol in HC phase T-1 | Grams unreacted p-nitrosophenol in methanol phase B-6 | Conversion of p-nitrosophenol to p-nitrosophenyl methyl ether, percent |
|---|---|---|---|---|---|
| 21 | 2.38 | 0.040 | 0.031 | 0.072 | 94 |
| 22 | 2.38 | 0.040 | 0.038 | 0.069 | 94 |
| 23 | 2.48 | 0.057 | 0.032 | 0.042 | 98 |

With reference to FIGS. 2 and 3, as the extraction solvent, in the process of FIG. 4, progresses upwardly, the proportion of ether product extracted is increased so as in each instance to cause the etherification equilibrium to shift to the ether side. Also, any unreacted p-nitrosophenol in the system is of such low solubility in the hydrocarbon phase and of relatively high solubility in the methanol phase that as a result of the multistage contact, any unreacted p-nitrosophenol carried from the ether-forming reaction mixture in the hydrocarbon phase is substantially completely extracted from the hydrocarbon phase into the methanol phase for return to the etherification and conversion to ether product. Also, although impurities inherently present in the p-nitrosophenol reactant preferentially stay in the alcohol phase, trace proportions are extracted into the solvent phase and are then selectively extracted therefrom into the methanol phase. The hydrocarbon ether solution such as hydrocarbon phase T-1 is, therefore, substantially free from all contaminants.

A large number of combinations of aromatic, paraffin and cycloparaffin hydrocarbons is utilized in the practice of the invention. The aromatic hydrocarbons contemplated are benzene, toluene, o-, m- and p-cymenes. Exemplary paraffin hydrocarbons are n-pentane, n-hexane, isohexanes, n- and isoheptanes, isooctane and isooctane mixtures, n-nonane and n-decane. Exemplary cycloparaffins are cyclopentane, cyclohexane and cycloheptane. Hydrocarbon mixtures advantageously employed as the aromatic hydrocarbon liquid are benzene-isooctane, toluene-cyclopentane, p-cymene-cyclohexane and the like.

The organic halides contemplated as extraction solvents in the practice of the invention are isopropyl chloride, isopropyl bromide, n-amyl bromide, n-amyl chloride and phenylmonochloride (monochlorbenzene). Now preferred organic halide hydrocarbon extraction solvent mixtures include isopropyl chloride-octane, n-amyl chloride-hexane, and monochlorbenzene-heptane.

Any acid can be utilized as a catalyst in carrying out the etherification. However, to the extent that some acid catalysts may be reactive with the added inorganic halide to form a salt exhibiting insolubility in the etherification reaction mixture by precipitation, such acid catalysts are not advantageously utilized. However, in that event, the product of the acid-halide reaction is also inclusive of a water soluble catalyst unreactive with the inorganic halide so that the etherification reaction proceeds. For example, when employing sulfuric acid as the etherification catalyst, together with calcium chloride as the inorganic halide, calcium sulfate forms and precipitates, but there is a formation of hydrogen chloride which serves as a catalyst to support the etherification reaction. However, in use of such catalyst, it is preferred that the inorganic halide be present in more than the above described minimum proportion of 12 weight percent, although the latter amount is sufficiently in excess of the amount of acid present for accomplishing a reasonable degree of phase separation.

In carrying out the process of the invention on a continuous flow basis, utilizing a packed chamber, such as chambers 10 or 10', it is advisable to refrain from use of a catalyst which may cause precipitation inasmuch as such precipitation obstructs flow through the packing which requires more frequent shutdown for maintaining the desired flow. Particularly in the practice of the process of the invention on a continuous flow basis, the preferred acid catalysts are hydrochloric, p-toluene sulfonic, hydrobromic, hydroiodic and benzene sulfonic. However, dependent upon the particular processing embodiments to be utilized, other acid catalysts can be employed, as for example, sulfonic, phosphoric, methane sulfonic, orthophosphoric, pyrophosphoric, boron trifluoride and the like. The general acid catalysts for the etherification are disclosed in further detail in the above referred to U.S. Patent 3,107,265.

The amount of acid catalyst employed is that sufficient for catalyzing the etherification reaction, i.e., at least a catalytic amount, generally a proportion of acid in mole ratio to p-nitrosophenol introduced into the etherification within the range of from 0.001:1 to about 0.1:1 although higher ratios can be utilized when desired, such as up to about 1:1.

Although I have found that etherification reaction temperatures in the range of from about 20 to 45° C. are generally preferred, etherification may in some instances be advantageously carried out at temperatures as low as 0° C. and up to about 60° C. Below 0° C., the rate of reaction is generally too low to be commercially significant whereas at temperatures above 60° C., phase separation is sometimes impaired.

The amount of total alcohol reactant introduced into the etherification reaction is in stoichiometric excess of the p-nitrosophenol added and is generally in a mole ratio thereto up to about 100:1, a mole ratio from about 15:1 to 30:1 being more often utilized. In some instances it is advantageous to use still higher ratios, particularly when dilution does not present an operating problem, in which event, equilibrium conversions as high as about 70 can be obtained as result of high reactant concentrations.

Contact time during etherification is dependent upon the temperature employed, and is, in most instances, most advantageously within the range of from about 15 to about 70 minutes although time conditions outside that range can be employed.

Time of contact of the extraction solvent wtihin the etherification reaction mixture for effecting extraction of the ether product is less than that required for the etherification so that actual contact time in that regard need never be greater than that required by the etherification. Time of contact of extraction solvent phase (extract) with the alcohol reactant prior to passage of the latter into the etherification zone is generally about the same as that required for the extraction-etherification, say in the range of from about 5 to 40 minutes, and preferably so when operating on a continuous flow basis.

Although the inorganic halide can be added to the system in any suitable manner, as for example, addition of the dry salt separately into chamber 10 of FIG. 1, it is most advantageous, from a processing standpoint, to add the inorganic halide in solution with the alcohol etherification reactant. Addition of the acid catalyst in solution with the alcohol reactant is also the general practice.

Pressure employed in the practice of any of the embodiments of the invention is not critical except that it be sufficient to maintain the entire system in liquid phase.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. An etherification process which comprises introducing p-nitrosophenol and an alcohol selected from the group consisting of methanol and ethanol into liquid phase admixture in an alcohol to p-nitrosophenol mole ratio up to 100:1 and in stoichiometric excess of that required for reaction of said alcohol with said p-nitrosophenol to form the corresponding p-nitrosophenylalkyl ether, and then reacting alcohol with p-nitrosophenol, in said liquid phase, in the presence of an acid as a catalyst, to form said p-nitrosophenylalkyl ether; contacting resulting ether-containing reaction mixture, in the presence of an inorganic halide dissolved therein, with an organic solvent at a temperature of from 0–60° C.; said organic solvent, when said alcohol is methanol, being selected from the group consisting of (1) an aromatic hydrocarbon of the group of benzene and methyl benzenes and (2) an organic halide of the group of isopropyl chloride, isopropyl bromide, n-amyl bromide, n-amyl chloride, and phenyl monochloride, and when said alcohol is ethanol said organic solvent being that above described but with said aromatic hydrocarbon additionally containing from 35–65 volume percent of a saturated hydrocarbon selected from the group consisting of paraffins containing from 5–10 carbon atoms and single ring cycloparaffins containing from 5–7 carbon atoms in the ring and said organic halide additionally containing from 35–65 volume percent of paraffin hydrocarbon containing from 5–10 carbon atoms; said inorganic halide being selected from the group consisting of calcium chloride, magnesium chloride, lithium chloride, cobalt chloride, nickel chloride, calcium bromide, and sodium iodide, and present in said ether-containing reaction mixture in an amount of from about 12 weight percent up to saturation, based upon said alcohol introduced into said liquid phase admixture whereby said solvent, which exhibits high solvent action for the ether product but is normally completely miscible with the ether-forming reaction mixture is caused by the presence of said inorganic halide to form a liquid phase separate from said reaction mixture and the resulting solvent phase retains the high solvent action of said solvent for said ether product to function as a highly selective solvent therefor, and recovering resulting extract phase as product of the process.

2. A process of claim 1 wherein said alcohol is methanol and said solvent is said aromatic hydrocarbon.

3. A process of claim 2 wherein said aromatic hydrocarbon contains from 5 to 35 volume percent of a saturated aliphatic hydrocarbon of the group of paraffins containing from 5–10 carbon atoms, and single ring cycloparaffins containing from 5–7 carbon atoms in the ring.

4. A process of claim 1 wherein said ether-containing reaction mixture is contacted countercurrently with said solvent.

5. A process of claim 3 wherein said solvent is benzene containing isooctane, said inorganic halide is calcium chloride, said catalyst is HCl, the mole ratio of said methanol to p-nitrosophenol is from 15:1 to 30:1, the mole ratio of said HCl to said p-nitrosophenol is from 0.001:1 to 0.1:1, the resulting etherification reaction mixture is contacted countercurrently with said solvent, and the temperature of the resulting ether-forming reaction mixture in contact with said solvent is from 20 to 45° C.

6. A process for the manufacture of p-nitrosophenylmethyl ether which comprises admixing, in liquid phase, p-nitrosophenol with methanol containing calcium chloride dissolved therein in an amount from 12 weight percent up to saturation, and with an acid selected from the group consisting of p-toluene sulfonic, hydrochloric, hydroiodic, hydrobromic and benzene sulfonic, in a mole ratio of methanol to p-nitrosophenol of from 15:1 to 30:1 and in a mole ratio of said acid to said p-nitrosophenol of from 0.001:1 to 0.1:1, and maintaining resulting admixture at a temperature of from 20 to 45° C. for a period of from 15 to 70 minutes, whereby etherification takes place to form said ether; passing resulting etherification reaction mixture into a central section of an upright chamber and downwardly therein; passing benzene into a lower section of said chamber and then upwardly in contact with said etherification reaction mixture therein, whereby said benzene and said reaction mixture form separate liquid phases, and maintaining the temperature of said reaction mixture during said contacting of same with said benzene in the range of from 20 to 45° C.; passing an additional portion of methanol, containing calcium chloride in an amount of from 12 weight percent up to saturation, into an upper section of said chamber and downwardly therein in an amount not greater than that required to increase the above said methanol to p-nitrosophenol mole ratio to 100:1, passing resulting benzene phase upwardly from contact with said etherification reaction mixture into contact with said additional methanol portion at a temperature in the range of 20 to 45° C. whereby said benzene and said methanol in said upper chamber section form separate liquid phases; passing methanol downwardly from said upper chamber section into said central section as a component of the etherification reaction mixture therein; withdrawing residual etherification reaction mixture from a lower section of said chamber; and passing benzene phase upwardly from contact with said additional methanol portion and withdrawing same as product of the process.

7. A process of claim 6 wherein said benzene contains from 5 to 35 volume percent of a paraffin hydrocarbon containing from 5 to 10 carbon atoms in the molecule.

8. A process of claim 6 wherein said benzene contains from 5 to 35 volume percent of a cycloparaffin hydrocarbon containing from 5 to 7 carbon atoms in the ring.

9. A process for the manufacture of p-nitrosophenyl-methyl ether which comprises admixing, in liquid phase, p-nitrosophenol with methanol containing calcium chloride dissolved therein in an amount from 12 weight percent up to saturation, and with an acid selected from the group consisting of p-toluene sulfonic, hydrochloric, hydroiodic, hydrobromic and benzene sulfonic, in a mole ratio of methanol to p-nitrosophenol of from 15:1 to 30:1 and a mole ratio of said acid to said p-nitrosophenol of from 0.001:1 to 0.1:1, and maintaining resulting mixture at a temperature of from 20 to 45° C. for a period of from 15 to 70 minutes, whereby etherification takes place to form said ether; passing the resulting etherification reaction mixture into an upper section of a first upright chamber and then downwardly therein; passing benzene into a lower section of said first chamber and then upwardly in contact with the etherification reaction mixture therein, whereby said benzene and said reaction mixture form separate liquid phases; maintaining the temperature of said reaction mixture during contact of same with said benzene in the range of from 20 to 45° C.; withdrawing residual etherification reaction mixture from said first chamber; passing an additional portion of methanol, containing calcium chloride in an amount from 12 weight percent up to saturation, into an upper section of a second upright chamber and then downwardly therein in an amount not greater than that required to increase the above said methanol to p-nitrosophenol ratio to 100:1; withdrawing resulting benzene phase from an upper section of said first chamber and passing same into a bottom section of said second chamber and then upwardly in contact with said additional methanol portion therein at a temperature of from 20 to 45° C., whereby said benzene and said methanol in said second chamber form separate liquid phases; withdrawing methanol phase from a lower section of said second chamber and passing same to admixture with p-nitrosophenol and said acid catalyst as a reactant component of the above said etherification; passing benzene phase from contact with methanol in said second chamber and then withdrawing same from said second chamber as product of the process.

10. A process of claim 9 wherein said benzene contains from 5 to 35 volume percent of a paraffin hydrocarbon containing from 5 to 10 carbon atoms in the molecule.

11. A process of claim 9 wherein said benzene contains from 5 to 35 volume percent of a cycloparaffin hydrocarbon containing from 5 to 7 carbon atoms in the ring.

12. A process of claim 10 wherein said solvent is benzene-isooctane.

13. A process of claim 1 wherein the mole ratio of said acid to said p-nitrosophenol is within the range of from 0.001:1 to 0.1:1.

References Cited

UNITED STATES PATENTS

| | | | |
|---|---|---|---|
| 1,312,186 | 8/1919 | King et al. | 260—615 |
| 3,107,265 | 10/1963 | De Butts et al. | 260—612 |

OTHER REFERENCES

Kobe et al.: Jour. Physical Chem., vol. 44 (1940), pp. 629–633.

Weissberger: Separation and Purification, part 1, 2nd ed. (1956), vol. III, pp. 183, 184, 243 and 304.

BERNARD HELFIN, *Primary Examiner.*